April 17, 1934.  G. LAUGHLIN  1,955,642
COLLET
Filed May 11, 1933
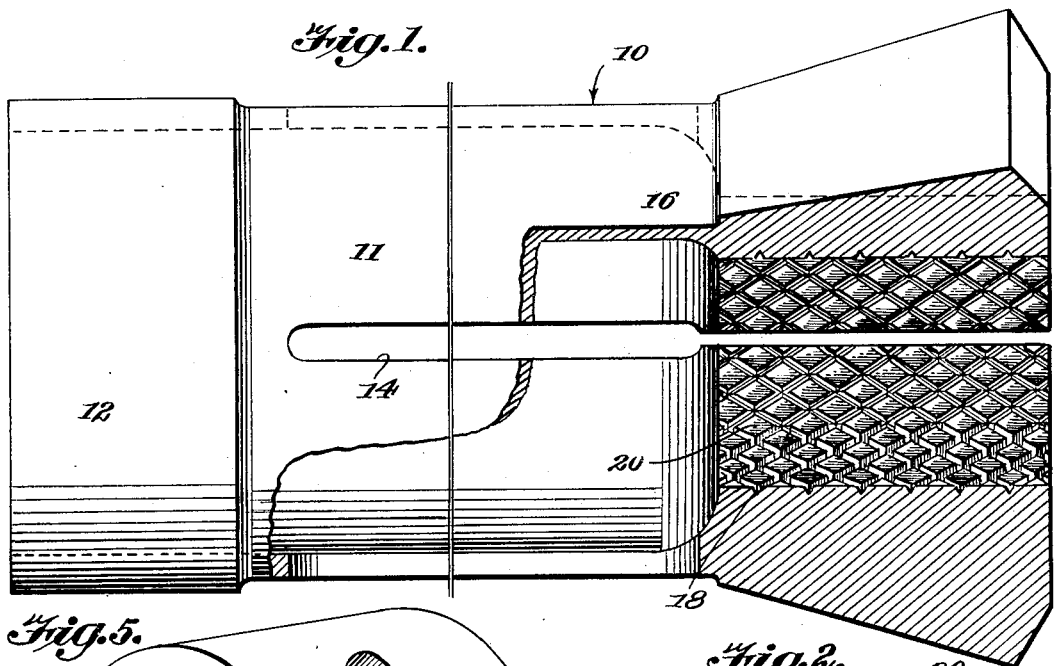
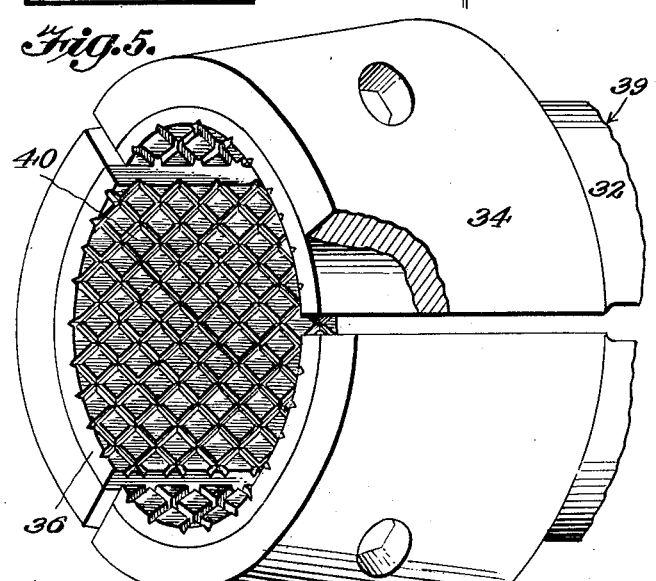
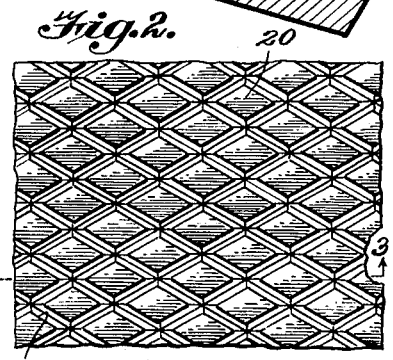
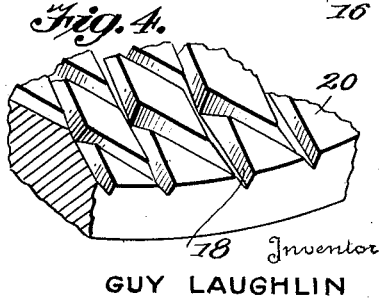
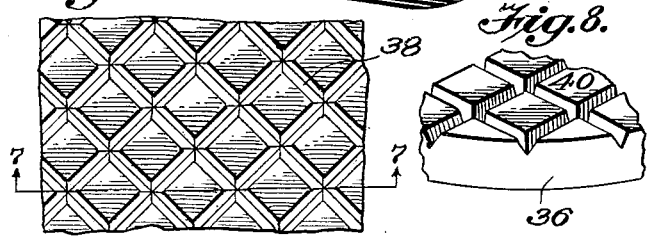
Inventor
GUY LAUGHLIN
Attorney Patented Apr. 17, 1934

1,955,642

UNITED STATES PATENT OFFICE 1,955,642

COLLET

Guy Laughlin, Birmingham, Mich.

Application May 11, 1933, Serial No. 670,557

7 Claims. (Cl. 29—62)

This invention relates to collets and master collets with pads for use on automatic and hand screw machines and other machines in which bar stock, or other work is fed to and is held in position by the collet while being operated upon by suitable tools.

In some of the collets in common use the gripping surfaces are formed with longitudinal and circumferential intersecting grooves defining facets or serrations which, of course, have the edges thereof at right angles to each other and extending longitudinally and transversely of the collet giving a greater purchase or grip on the work than in the case of a collet having a smooth or full gripping surface. However, the square serrations with truly longitudinal and circumferential edges has its limitations for use in connection with certain work and with an appreciation of this, the invention forming the subject of this application will be found to embody a collet in which the gripping surface thereof is formed with spiraled or diagonal intersecting grooves defining facets in longitudinally overlapping relation, with the end points of the facets in longitudinal alignment and the side points of the facets in circumferential alignment, all to the end that the collet may have effective gripping engagement with the work.

In connection with the matter set forth in the immediately preceding paragraph, it might be explained that in recent years, the last five or six, tool steel manufacturers have been able to produce cutting steels that will stand about double the amount of speeds and feeds formerly possible or feasible. It has been a problem of the first magnitude to adapt existing equipment or to design new equipment able to hold the bar stock of metal tight enough to take care of the increased speeds and heavier feeds made possible by newly developed cutting steel.

Efforts to use existing collets with conventional square serrations having sides extending longitudinally and circumferentially of the collet have, in many cases, resulted in longitudinal and circumferential scoring of the bar of stock. Further, in many cases, efforts to use to advantage the high speeds and heavy feeds necessary for the most expeditious use of expensive high speed cutting metals have resulted in serious slippage of the work.

In summarizing this situation it will be seen that while there are available cutting steels that will stand vast increase in cutting speeds and similarly great increases in feeds, there has been no corresponding improvements in the stock feeding and holding means or collet necessary to handle these high speeds and heavy feeds.

Those interested in the development of the art have tried various sizes and shapes of conventional square types of serrations for engaging and gripping the metal stock while others have resorted to variously shaped grooves between the serrations or facets on the interior of the collet. None of these has proved entirely satisfactory due to the straight line grooves both radially and longitudinally, and so far as I know, I am the first to provide a collet of the type disclosed in which there are a plurality of internal intersecting helical grooves defining facets having longitudinally overlying portions by which there is broken the straight line effect both longitudinally and circumferentially which, in some metals scores the metal while in others, allows of an objectionable slipping of the metal, of the collet, as the case may be.

Except for the foregoing arrangement of the facets or serrations, a collet embodying this invention need not be unlike collets of present conventional design so that the invention may be practiced without departure from present production methods.

Other objects and advantages will be apparent during the course of the following description.

In the accompanying drawing forming a part of this application and in which like numerals are employed to designate like parts throughout the same, Figure 1 is a side elevation of a collet partly broken away to illustrate the invention, the serrations being of diamond-shaped outline, Figure 2 is a fragmentary plan view of the gripping surface disclosed in Figure 1, Figure 3 is a detail sectional view taken on line 3—3 of Figure 2, Figure 4 is a fragmentary perspective of the gripping surface illustrated in Figure 1, Figure 5 is a fragmentary perspective of a master collet with pads in which the gripping surface thereof is made up of a plurality of rectangular facets, Figure 6 is a fragmentary plan view of the gripping surfaces illustrated in Figure 5, Figure 7 is a detail sectional view taken on line 7—7 of Figure 6, Figure 8 is a fragmentary perspective of one of the gripping pads shown in Figure 5.

In the drawing the numeral 10 designates a tubular body which may, of course, be formed from pressed metal, tubing, cast metal, or machined from solid stock. When completed the tubular body 10 will be found to be provided with conventional attaching means 12 in the form of a stem threaded internally or externally.

As shown in Figure 1, the tubular body is provided with a plurality of spaced spiral longitudinally extending incisions 14 opening out through the gripping end of the collet to define a plurality of transversely curved fingers 16 for gripping relation with the work about which the collet extends.

As shown in Figure 1, the free end portions of the fingers 16 are provided in the inner surfaces thereof with a gripping surface, in this case defined by helical or spiral grooves 18 intersecting at acute angles to each other to define a plurality of diamond-shaped facets 20.

Referring now to Figure 2 it will be seen that the facets have the longitudinal end portions thereof in overlapping relation and in lines extending parallel to the longitudinal axis of the collet, while the side points of the facets are in a line extending circumferentially at right angles to the longitudinal axis of the collets.

In carrying out the invention as shown in Figure 3 the grooves 18 are V-shaped in cross-section so that the work engaging edges thus produced will be sufficiently sharp for effective use.

In the form of invention illustrated in Figures 5, 6, 7 and 8, the collet is generally designated by the numeral 30 and is formed with a plurality of transversely curved spring fingers 32 having jaws 34 which carry pads 36 for engagement with the work of whatever nature it happens to be.

It is clearly shown in Figures 5 and 6 that the pads are provided with helical or spiral grooves 38 intersecting at right angles to define a plurality of rectangular facets 40 for engagement with the bar stock or the like.

Since the grooves 38 intersect at right angles, the longitudinal points of the facets will be in parallel lines extending parallel to the longitudinal axis of the collet while the side points of the facets will be in parallel circumferentially extending lines, the circumferential lines being located at right angles to the longitudinal axis of the collet.

As in the case of the form of invention illustrated in Figures 1, 2, 3 and 4 the helical grooving is V-shaped in cross section to define the desired gripping edges for engagement with the work although the grooves may be otherwise shaped in cross section to meet requirements.

As brought out in the opening paragraphs of this specification, the advent of high speed cutting metals has, through the use of vast increase in speeds and feeds, added greatly to the capacity of screw machines while, at the same time, there has been no corresponding improvement in such machinery to allow of the fullest possible use of such high speed cutting steel.

So far as I am aware, I am the first to produce a collet having internal sets of intersecting helical grooves defining facets having longitudinally overlying end portions and at the same time having laterally or circumferentially overlying side points breaking the straight longitudinal and circumferential lines, which in previously known collets, many times allowed of the slippage of the stock with respect to the collet or vice versa and in which in other cases, resulted in scoring of the stock.

The use of the more or less diamond shaped serrations produces a substantial increase in the line of contact between the edges of the facets and the opposed surface of the stock. That is to say, this line is materially greater than a straight line contact in a case where the serrations are side by side with a longitudinally extending straight line between a particular pair of facets. It is the aggregate dimension of the stock engaging edges or corners of the facets that play such an important part in the effectiveness of the facets and where this line or dimension is increased due to the staggering of the facets, the holding effectiveness of the collet is, of course, correspondingly increased, as distinguished from a collet in which the sides and ends of the facets extend longitudinally and transversely, respectively, and are, of course, straight.

Having thus described the invention what is claimed is:

1. In a stock engaging collet for screw machines, a tubular body having a plurality of slots opening out through one end thereof thereby defining an annular series of transversely curved spring fingers, said fingers being provided with stock engaging means having the inner stock engaging surfaces thereof formed with sets of spaced intersecting helical grooves defining facets having longitudinally overlapping portions.

2. In a stock engaging collet for screw machines, a tubular body having a plurality of slots opening out through one end thereof thereby defining an annular series of transversely curved spring fingers, said fingers being provided with stock engaging means having the inner stock engaging surfaces thereof formed with sets of spaced intersecting helical grooves defining facets having longitudinally overlapping portions, the end points of the facets being in straight lines extending parallel to the longitudinal axis of the collet, said collets being provided with side points in circumferential lines extending approximately at right angles to the longitudinal axis of the collet.

3. In a stock gripping collet for screw machines, a tubular body having a plurality of slots opening out through one end thereof thereby defining an annular series of transversely curved spring fingers, said fingers being provided with work engaging means integral therewith and having the inner stock engaging surfaces thereof formed with sets of spaced intersecting helical grooves defining facets having longitudinally overlapping portions.

4. In a stock engaging collet for screw machines, a tubular body having a plurality of slots opening out through one end thereof thereby defining an annular series of transversely curved spring fingers, and detachably mounted pads surrounded by said fingers and having the inner surfaces thereof provided with sets of intersecting helical grooves defining facets having longitudinally overlapping end points and having side points in overlapping relation with respect to each other.

5. In a stock engaging collet for metal working machines, a tubular body of elongated form having a plurality of slots defining an annular series of transversely curved spring fingers, said fingers being provided with stock engaging means embodying groups of facets with the side portions of adjacent facets in longitudinally overlapping relation to avoid straight lines extending for substantial distances lengthwise of the collet and with the end portions of the facets in circumferentially overlapping relation to avoid straight lines extending for substantial distances circumferentially between the facets at right angles to the longitudinal axis of the collet.

6. In a stock engaging collet for metal working machines, a tubular body having a plurality of slots defining an annular series of transversely curved spring fingers, and pads surrounded by said fingers and having the inner surfaces thereof provided with groups of facets with the side portions of adjacent facets in longitudinally overlapping relation to avoid straight lines extending lengthwise of the collet between said facets, and with the end portions of the facets in circumferentially overlapping relation to avoid straight lines extending for substantial distances circumferentially of the collet between the facets and at right angles to the longitudinal axis of the collet.

7. In a collet for metal working machines, a tubular body having a plurality of slots defining stock embracing fingers, said fingers having stock engaging means embodying rows of facets with the facets of adjacent rows disposed in staggered relation and being overlapped lengthwise of the collet and circumferentially thereof.

GUY LAUGHLIN.